United States Patent [19]

Morrison

[11] 4,020,793
[45] May 3, 1977

[54] APPARATUS AND METHOD FOR RAISING AND TRANSPORTING POULTRY

[75] Inventor: Johnny Randall Morrison, Dalton, Ga.

[73] Assignee: B & J Machinery Co., Inc., Dalton, Ga.

[22] Filed: Dec. 29, 1975

[21] Appl. No.: 644,436

[52] U.S. Cl. .................................. 119/18; 119/22
[51] Int. Cl.² ....................................... A01K 31/06
[58] Field of Search ................. 119/17, 18, 19, 21, 119/22

[56] References Cited

UNITED STATES PATENTS

| | | | |
|---|---|---|---|
| 2,061,712 | 11/1936 | Martin | 119/18 X |
| 2,604,874 | 7/1952 | Forbes et al. | 119/21 X |
| 3,173,564 | 3/1965 | Mayo | 119/12 X |
| 3,274,973 | 9/1966 | Woods et al. | 119/22 X |
| 3,727,582 | 4/1973 | Heying et al. | 119/18 |
| 3,791,348 | 2/1974 | Marnett | 119/19 |
| 3,796,189 | 3/1974 | Blonded | 119/18 |
| 3,892,201 | 7/1975 | Crawford | 119/17 |
| 3,903,851 | 9/1975 | Van Huis | 119/18 |

Primary Examiner—Hugh R. Chamblee
Attorney, Agent, or Firm—Bell, Seltzer, Park & Gibson

[57] ABSTRACT

An apparatus and method for raising and transporting poultry and which is adapted to substantially eliminate the necessity of repeated manual handling of the poultry to thereby reduce labor costs and injuries to the poultry. The apparatus includes a portable enclosure for receiving and containing the poultry during growth and being of a size and construction suitable for being transported with the poultry therein by a truck, railway car or the like. At least one substantially horizontally extending endless conveyor is movably mounted in the housing and has an upper surface serving as a floor for supporting the poultry and receiving droppings therefrom. The conveyor is advanced at a relatively slow rate of speed which is substantially imperceptible to the poultry standing thereon, whereby the droppings and dead and infirm poultry are moved to the downstream end of the conveyor for removal.

6 Claims, 6 Drawing Figures

U.S. Patent   May 3, 1977   Sheet 1 of 2   4,020,793
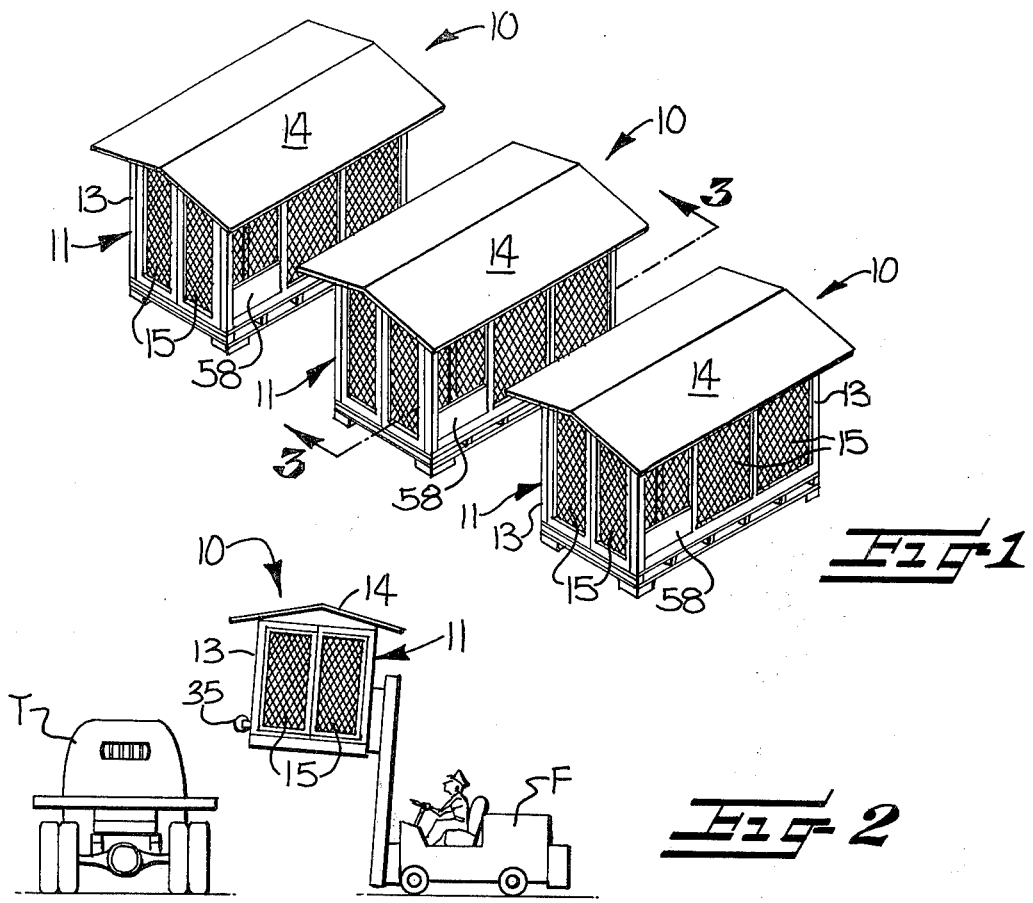
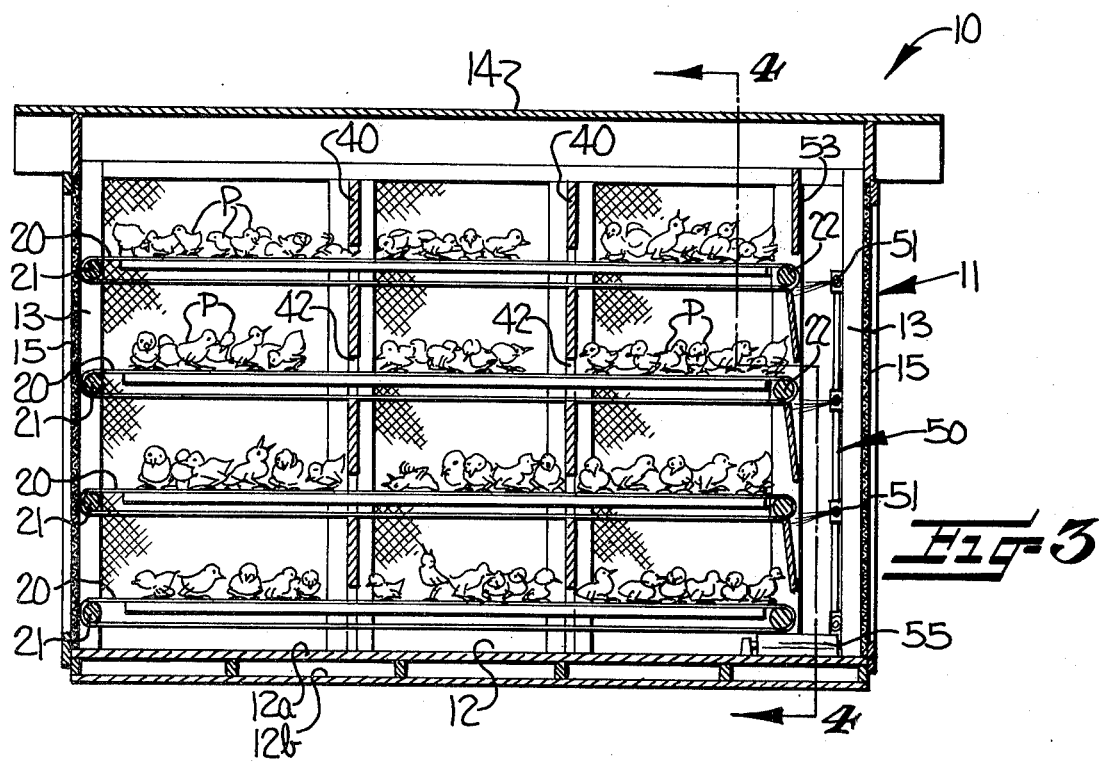

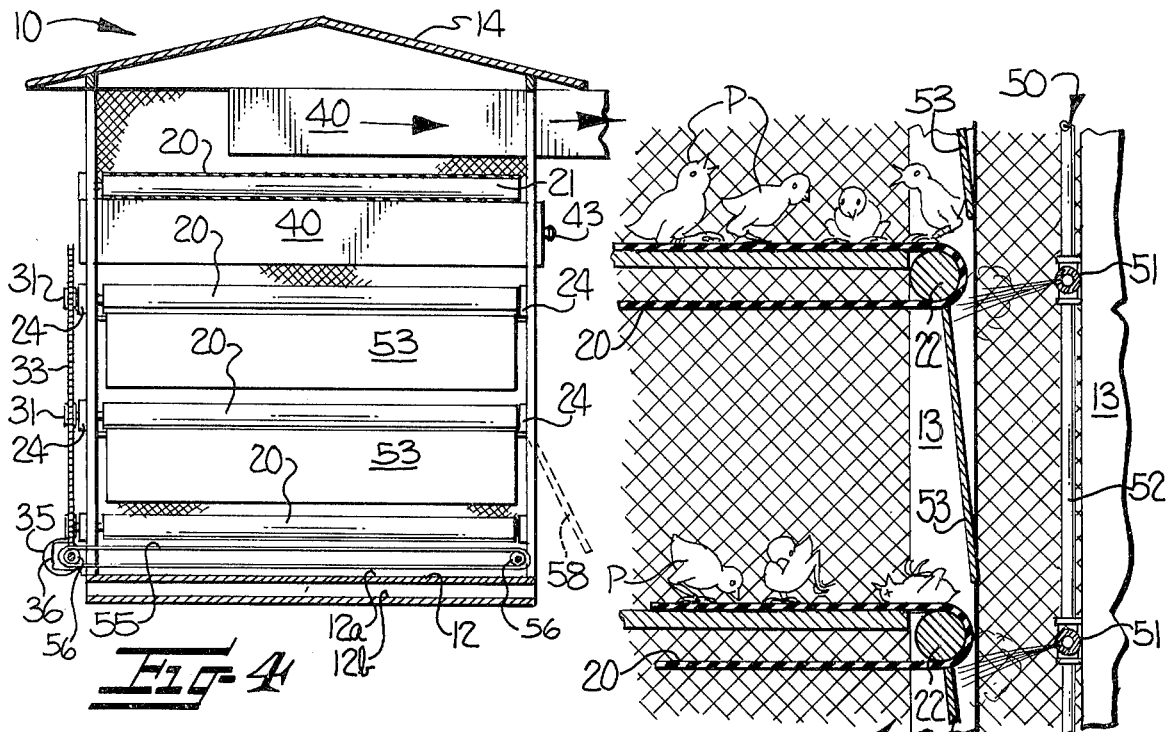
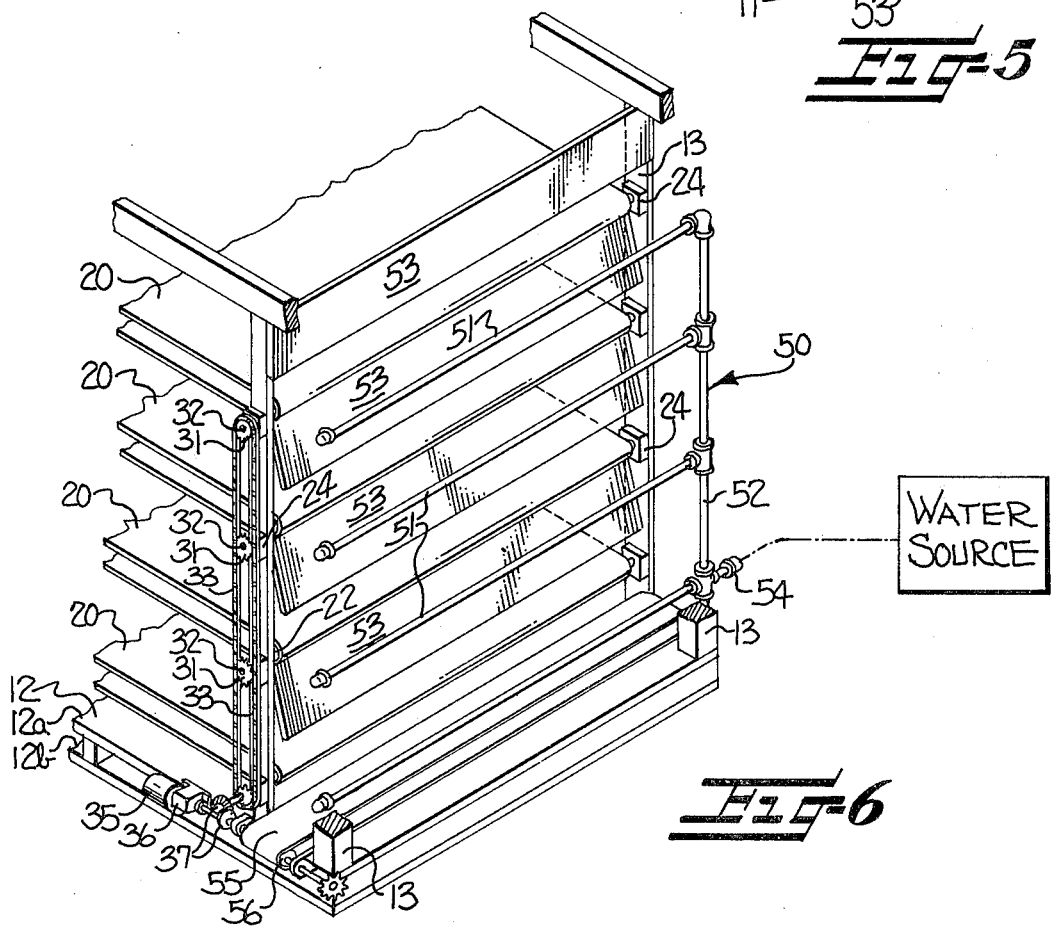

APPARATUS AND METHOD FOR RAISING AND TRANSPORTING POULTRY

BACKGROUND OF THE INVENTION

The present invention relates to an apparatus and method for efficiently and safely raising and transporting poultry, such as chickens and turkeys, from the time they leave a brooder until reaching maturity.

In the past several decades poultry production has evolved from small family farm operations to large businesses devoted solely to the production of poultry. These large poultry processors commonly raise several million birds each year, and while the technology of slaughtering and processing poultry for sale has changed dramatically, the methods and apparatus employed in raising poultry have changed very little. Thus, most poultry growers today use the same general methods and apparatus previously used on small farms, only on a far bigger scale.

Conventionally, when poultry are removed from the brooder, the birds are placed in large, open, one-story buildings where they are fed and maintained until they reach maturity six to nine weeks later. Usually the birds stand directly on the floor of the building upon a bed of litter, such as sawdust or wood shavings, which absorbs droppings. When the birds reach maturity, laborers are sent into the buildings to catch each bird individually and place it into a small cage with several other birds. Several hundred of the cages are then placed on a truck for transport to a processing plant.

Once the poultry are removed from the building, it is prepared for the next group of birds by cleaning the litter and droppings together with dead and infirm birds from the floor, and then covering the floor with a clean layer of litter.

The above described procedure for raising and transporting poultry presents several serious and persistent problems. For example, the type of building employed makes inefficient use of vertical space, since the birds are raised on only one level. These buildings also provide an unsanitary environment for the birds, and the accumulation of droppings on the floor promotes disease and thereby increases costs by slowing the rate of weight gain and reducing the number of birds available for marketing. Further, the buildings are difficult to keep clean and require expensive and scarce manual labor for the cleaning process.

Manual labor is also required in capturing the birds for placement in cages prior to shipment to a processing plant. The general undesirability of the job makes it difficult and expensive to find and keep employees. Also, the manual handling of the birds results in many birds being injured or bruised in the process, thus reducing their grade and value.

Prior attempts have been made to solve the problems outlined above, such as the multi-level enclosures for raising poultry as disclosed in U.S. Pat. No. 2,197,160, issued Apr. 16, 1940 and U.S. Pat. No. 2,212,549, issued Aug. 27, 1950. While the structures disclosed in these patents utilize space more efficiently and improve sanitation, they still require repeated manual handling of the birds with resulting injuries and bruises to the birds which characterizes the conventional poultry growing operations.

Likewise, prior proposals have been directed toward developing ways to reduce labor by providing mechanical means for loading poultry into cages for shipment to processing plants, as disclosed in U.S. Pat. No. 3,103,915, issued Sept. 17, 1963; 3,173,564, issued Mar. 16, 1965; 3,420,311, issued Jan. 7, 1969 and 3,568,643, issued Mar. 9, 1971. The devices disclosed in these patents are complex and expensive, and they still require some manual labor and therefore do not solve the problem of preventing injuries to the birds. Still further, a large stationary apparatus has been proposed for the preliminary rearing of livestock as disclosed in U.S. Pat. No. 2,604,874, issued July 29, 1952, but obviously there is no possibility of transporting the livestock in the apparatus and thus the danger of injury to the livestock during loading into the transport cages remains a problem.

SUMMARY OF INVENTION

Accordingly, it is an object of this invention to provide an apparatus and method which makes efficient use of space, provides a sanitary environment within which the poultry may rapidly mature, and which eliminates the need to transfer, manually or otherwise, poultry from one enclosure to another prior to the shipping of the same to a processing plant.

These and other objects and advantages of the present invention are achieved in the embodiment of the invention described herein by the provision of an apparatus which comprises a portable enclosure for receiving and containing the poultry during growth, and being of a size and construction suitable for being transported with the poultry therein by a truck, railway car or the like. At least one substantially horizontally extending conveyor is movably mounted in the enclosure and has an upper surface serving as a floor for supporting the poultry and receiving droppings therefrom. Drive means are carried by the enclosure and connected to the endless conveyor for at least periodically advancing the conveyor at a slow rate of speed so as to be imperceptible to the poultry standing on the conveyor. The conveyor moves accumulated droppings, as well as dead and infirm poultry, to the downstream end for removal.

Preferably, transverse partitions are carried by the enclosure in spaced relation along the length of the conveyor. These partitions separate the poultry into groups, and prevent live healthy poultry from leaving the enclosure. Also, the partitions are spaced sufficiently above the conveyor to allow infirm or dead poultry to pass to the end of the conveyor for removal. Cleaning means may also be mounted adjacent the downstream end of the conveyor for cleaning droppings therefrom.

BRIEF DESCRIPTION OF THE DRAWINGS

Some of the objects of this invention having been set forth above, other objects and advantages of the invention will appear as the description of the invention proceeds, when taken in conjunction with the following drawings, in which FIG. 1 is a perspective view of three apparatus according to the present invention;

FIG. 2 is a schematic view showing the manner in which an apparatus according to the present invention may be loaded onto a truck for transporting;

FIG. 3 is an enlarged vertical cross-sectional view taken substantially along the line 3—3 of FIG. 1;

FIG. 4 is a vertical cross-sectional view taken substantially along the line 4—4 of FIG. 3;

FIG. 5 is an enlarged fragmentary vertical cross-sectional detail of the upper portion of one end of the apparatus, showing the manner in which the conveyors are cleaned; and FIG. 6 is a fragmentary, perspective view of one end of the apparatus, with the walls removed for clarity, showing particularly the drive means and cleaning means of the apparatus.

DESCRIPTION OF PREFERRED EMBODIMENT

Referring now to the drawings, the poultry raising and transporting apparatus according to this invention is indicated generally at 10 in FIG. 1, three separate units of the apparatus 10 being illustrated.

The poultry raising and transporting apparatus 10 comprises a portable, modular enclosure 11 for receiving and containing poultry P upon leaving a brooder, and during the growth and maturing thereof. The enclosure 11 is of a size and construction suitable for being transported with the poultry P therein, by means of a truck T, railway car (not shown) or the like, to a processing plant for slaughter.

For the above purpose, the enclosure 11 is preferably constructed of relatively lightweight material, such as wood or tubular metal, and includes a framework comprising broadly a floor or bottom portion 12, a plurality of vertical reinforcing members 13, and a roof 14. The spaces between the vertical members 13 are closed by rectangular, open panels 15 which are covered by chicken wire or other porous material to form side walls. The panels 15 are preferably removably attached to the members 13 in order to permit feed and water containers to be placed within the enclosure 11 as hereinafter further described. Also, the panels 15 forming the end of the enclosure which is visible in FIG. 1 may be hingedly connected to the members 13 to define doors which are opened to load immature poultry P from a brooder therein, and to remove mature poultry P therefrom after transporting to a processing plant.

The floor 12 of the enclosure 11 is preferably of a double wall construction 12a and 12b, as shown particularly in FIG. 3, with an air space therebetween for facilitating the use of a forklift truck F, as shown in FIG. 2, to receive the forks thereof between the floor walls 12a and 12b for lifting the modular housing 11 onto a truck T for transportation of the poultry P therein to a processing plant.

The enclosure 11 may, if desired, be placed in a commond building with many other like enclosures, and where the temperature and humidity are closely controlled. In such cases, the roof 14 would not be required. During transport to a processing plant however, a temporary roof could be provided on the enclosure, or the truck or railway car could be of an enclosed type.

The poultry raising and transporting apparatus 10 further includes a plurality of substantially horizontally extending endless conveyors 20. The conveyors 20 are positioned within the enclosure 11 and in a vertically spaced and vertically aligned relationship with respect to each other, and each conveyor is movably mounted for movement about rolls 21, 22, the rolls being rotatably mounted in suitable bearing blocks 24 carried by the vertical members 13. Each conveyor 20 further defines an upper surface serving as a floor for supporting the poultry P placed within the enclosure 11, and for receiving the droppings from the poultry P. The conveyors 20 may be formed of any suitable material such as imperforate, flexible elastomeric or plastic material which has been secured together to form an endless belt or conveyor. The multi-level arrangement will be seen to accommodate a maximum quantity of poultry P within the dimensions of the enclosure 11, and thus provides an efficient use of space.

The poultry raising and transporting apparatus 10 further includes means carried within the enclosure for rotatably interconnecting the conveyors 20 such that the conveyors are adapted to be advanced in unison. More particularly, this interconnecting means includes sprockets 31 secured to stub shafts 32 which extend coaxially from one end of the rolls 22 and through the bearing block 24 and vertical support 13, as best seen in FIGS. 4 and 6. The sprockets 31 mount a common drive chain 33 thereabout.

Drive means, in the form of an electric motor 35 and gear box 36, operatively connected to the drive chain 33 by the bevel gears 37, such that the conveyors may be advanced in unison. The motor 35 and gear box 36 are fixedly mounted on the floor 12 of the housing, and the motor is preferably of a reversible, two-speed construction. By this arrangement, the conveyors 20 may be selectively advanced at a relatively rapid rate of speed forwardly to facilitate the loading of the poultry thereon, and reversely advanced at a corresponding relatively rapid rate to facilitate the subsequent unloading of the poultry at the processing plant. In addition, the motor 35 and gear box 36 are designed such that the conveyors 20 may be periodically or continuously advanced at a relatively slow rate of speed on the order of about one complete revolution of the conveyor each hour so as to be substantially imperceptible to the poultry P standing thereon. This relatively slow rotation of the conveyor 20 takes place during the period in which the poultry is maintained and grown in the enclosure, and serves to move the droppings and dead and infirm poultry to the downstream end of the conveyors, preferably the opposite end from which the access doors, described above, are located, for removal of the droppings and dead and infirm poultry P from the enclosure 11. As the conveyors 20 are thus moved, the live and healthy poultry P being raised within the enclosure 11 will walk or move along the slowly moving conveyor to retain their positions within the enclosure.

To aid in maintaining the live, healthy poultry P being raised within the enclosure 11 in desired positions evenly spaced therein, the apparatus 10 further includes a plurality of partitions 40 carried by the enclosure in transverse, spaced relation along the length of each of the conveyors 20, as shown particularly in FIG. 3. The partitions 40 are disposed a suitable distance above the upper surface of the conveyors 20 to separate groups of poultry P and maintain the groups in their desired positions within the enclosure 11 and to enable the passage under the partitions 40 of dead or infirm poultry and poultry droppings, but not live healthy poultry. In this regard, the partitions may be fabricated from a lightweight flexible plastic material or the like, and such that the flexibility of the partitions together with the inherent vertical play of the conveyor 20 permits the dead or infirm poultry to pass thereunder.

The partitions 40 are mounted in the above described positions in the enclosure 11 by slots 42 in the vertical reinforcing members 13 of the framework forming the enclosure. The partitions 40 include knobs 43 on one end thereof which protrude outwardly from the enclosure for gripping by an operator for removing the partitions 40 from the enclosure to open the space along the conveyors 20. Such removal is desirable to facilitate inserting immature poultry P within the enclosure, as well as the removal of mature poultry P therefrom after transportation to a processing plant.

The poultry raising and transporting apparatus 10 further includes cleaning means, broadly indicated at 50, which is carried by the modular enclosure for cleaning poultry droppings from the conveyors 20 and for removal of the poultry droppings and dead and infirm poultry. The cleaning means 50 comprises spray arms 51 mounted at the downstream end of the enclosure so that a spray arm will be adjacent to and extend transversely of each end of the conveyors 20 for directing a spray of cleansing fluid or water onto the conveyors 20 as they pass around rolls 22, as may be seen in FIGS. 3, 5 and 6. The spray arms 51 are commonly connected with a cleansing fluid conduit 52 which is suitably mounted on the floor 12 of the enclosure and includes a connection 54 for coupling with any suitable cleansing fluid or water source, as indicated schematically in FIG. 6.

To aid in this cleansing action by the spray arms 51, baffles 53 are positioned adjacent the ends of the conveyors 20, as shown in FIGS. 3, 5 and 6, and have their upper edges thereof in scraping contact with the upper surface of the conveyors 20 as they pass around and under the rolls 22 for scraping droppings and other material from the conveyors 20 as they pass around the rolls 22. These baffles 53 are angularly positioned for directing the spray of cleansing fluid from the spray arms 51 onto the upper, outer surface on the conveyors 20 as they pass around rolls 22 and to prevent the fluid from continuing down the surface of the conveyors 20. The baffles 53 are normally fixedly mounted between the adjacent vertical members 13 of the enclosure, but they could be mounted in suitable slots in the corresponding vertical support member 13 of the enclosure so as to be removable therefrom. Also, the lower edge of the baffles 53 are positioned a predetermined distance above the lower conveyor such that the baffles serve as partitions to prevent the live, healthy poultry from leaving the conveyor belts 20, while permitting the dead and infirm poultry to pass thereunder. In this regard, the baffles 53 may be fabricated from a flexible plastic material similar to the construction of the partitions 40.

The cleaning means 50 further includes a removal conveyor 55 positioned adjacent and below the downstream ends of the conveyors 20 at the bottom of the enclosure 11 for receiving the droppings, dead and infirm poultry, and other material removed from the conveyors 20 by the scraping action of baffles 53 and the action of the cleansing fluid from the spray arms 51. This removal conveyor 55 is mounted on suitable rolls 56 mounted on and carried by the floor 12 of the enclosure, and with one of the rolls 56 being connected with the gear box 36 so as to be rotated by the motor 35. Also, the removal conveyor 55 is mounted to extend in a direction transverse to the direction of the poultry supporting conveyors 20, such that the conveyor 55 serves to carry and remove the droppings and dead and infirm poultry P to one side of the enclosure. This one side of the enclosure may include a suitable door 58, as shown in FIG. 1 and as shown in dotted lines in FIG. 4, for being opened to allow the dead and infirm poultry and droppings to be expelled from the apparatus 10 by the removal conveyor 55.

The apparatus 10 of the present invention may further comprise suitable food and water trays (not shown) on either side of each conveyor 20. Alternately, the trays may be positioned to extend down the middle of the conveyors to promote further separation of the poultry.

The enclosures 11 as illustrated are generally of a size to permit handling by a forklift truck F, and to permit several to be loaded onto a conventional flat bed truck T. For example, the enclosures may be about eight feet wide and fifteen feet long, with the individual conveyors being vertically separated about two feet. However, larger sizes, such as eight feet by thirty feet, or even forty feet, are possible. Such larger units would however require a heavy lift or crane to raise the units onto the bed of the truck.

From the foregoing, it may be seen that this invention provides a method for raising and transporting poultry which is characterized by eliminating the necessity of repeated manual handling of the poultry to thereby reduce labor costs and substantially eliminate injuries to the poultry which might occur from the normal manual handling thereof. More particularly, the method includes the steps of containing and raising the poultry from the time the poultry leaves a brooder until maturity thereof in a portable enclosure, loading the enclosure and contained poultry onto a conveyance, such as a truck, railway car, or the like, upon the poultry reaching maturity, and then transporting the enclosure and contained poultry to the processing plant for slaughter. The poultry is supported on a conveyor during the raising period, and the droppings and dead and infirm poultry may be periodically or continuously removed from the enclosure by advancing the conveyors at a relatively slow speed which is substantially imperceptible to the poultry.

The above-described poultry raising and transporting apparatus of this invention improves sanitation and provides a clean environment for raising and transporting of poultry in a self-containing, modular unit which is easily movable, not heretofore attainable with conventional methods and apparatus.

In the drawings and specification, there has been set forth a preferred embodiment of this invention and, although specific terms are employed, they are used in a generic and descriptive sense only and not for purposes of limitation.

That which is claimed is:

1. An apparatus for raising and transporting poultry or the like and being characterized by a self-contained, portable construction for receiving the poultry upon leaving a brooder and for containing the poultry until reaching maturity and for transporting the poultry therein to a processing plant to thereby eliminate the necessity of repeated manual handling of the poultry, said apparatus comprising:

a portable enclosure adapted to receive and contain poultry during growth and being of a size and construction suitable for being transported with the poultry therein by a truck, railway car or the like, a plurality of substantially horizontally extending endless conveyors movably mounted in said enclosure in a vertically spaced and vertically aligned relationship with respect to each other, and each conveyor having an upper surface serving as a floor for supporting the poultry and receiving droppings therefrom, means carried by said enclosure for rotatably interconnecting said conveyors such that said conveyors are adapted to be advanced in unison and the droppings and dead and infirm poultry may be moved to the downstream end of said conveyors for removal, a plurality of partitions carried by said enclosure in transverse spaced relation along the length of each of said conveyors, each of said partitions being disposed a predetermined distance above said upper surface of the associated conveyor to separate the poultry into groups along the length of the conveyor and while permitting the passage of dead or infirm poultry thereunder, means carried by said enclosure adjacent the downstream end of each of said conveyors for cleaning the surface thereof as the conveyor is advanced to thereby remove the droppings from the conveyor, and means for removably mounting said partitions within said enclosure to facilitate the loading and unloading of the poultry.

2. An apparatus according to claim 1, wherein said apparatus further comprises drive means, including an electric motor carried by said enclosure and operatively connected to said means for rotatably interconnecting said conveyors, for advancing said conveyors at a relatively slow rate of speed substantially imperceptible to the poultry standing thereon.

3. An apparatus according to claim 2, wherein said drive means includes means for selectively advancing each of said conveyors forwardly at a relatively rapid rate of speed to facilitate the loading of the poultry thereon, and advancing each of the conveyors rearwardly at a relatively rapid rate of speed to facilitate the unloading of the poultry therefrom.

4. An apparatus according to claim 1, wherein said cleaning means comprises means for scraping the surface of each conveyor as it is advanced.

5. An apparatus according to claim 4 wherein said cleaning means further comprises spray arm means for directing a cleansing spray of fluid against each conveyor as it is advanced to further facilitate the removal of the droppings therefrom.

6. An apparatus according to claim 4 wherein said apparatus further comprises a removal conveyor carried within said enclosure and below the downstream end of said poultry supporting conveyors for conveying the droppings removed from said poultry supporting conveyors to a central point of discharge, said removal conveyor extending in a direction transverse to the direction of said poultry supporting conveyors.

* * * * *